(12) United States Patent
Chun et al.

(10) Patent No.: US 10,545,897 B2
(45) Date of Patent: Jan. 28, 2020

(54) SYSTEM AND METHOD FOR DETERMINISTIC TRANSACTIONS ON A SERIAL BUS

(71) Applicant: QUALCOMM INCORPORATED, San Diego, CA (US)

(72) Inventors: Christopher Kong Yee Chun, Austin, TX (US); Chris Rosolowski, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/106,118

(22) Filed: Aug. 21, 2018

(65) Prior Publication Data

US 2019/0227968 A1 Jul. 25, 2019

Related U.S. Application Data

(60) Provisional application No. 62/621,481, filed on Jan. 24, 2018.

(51) Int. Cl.
*G06F 13/362* (2006.01)
*G06F 13/42* (2006.01)
*G06F 1/28* (2006.01)

(52) U.S. Cl.
CPC .............. *G06F 13/362* (2013.01); *G06F 1/28* (2013.01); *G06F 13/4282* (2013.01)

(58) Field of Classification Search
CPC .......................... G06F 13/362; G06F 13/4282
See application file for complete search history.

(56) References Cited

U.S. PATENT DOCUMENTS

| 8,521,101 | B1 | 8/2013 | Kadam et al. |
| 9,042,499 | B2 | 5/2015 | May et al. |
| 2002/0023186 | A1* | 2/2002 | Kim ...................... G06F 13/362 710/244 |
| 2014/0235301 | A1* | 8/2014 | Segev .................. H02M 3/156 455/574 |
| 2017/0168966 | A1 | 6/2017 | Mishra et al. |
| 2017/0212850 | A1 | 7/2017 | Mishra et al. |
| 2017/0220503 | A1 | 8/2017 | Southcombe et al. |

* cited by examiner

*Primary Examiner* — Zachary K Huson
(74) *Attorney, Agent, or Firm* — Qualcomm Incorporated (57) ABSTRACT

Systems and methods are disclosed method for operating a serial interconnect of a computer system in a time deterministic manner. An exemplary method comprises that a command to be sent over the serial interconnect in a transaction is to be executed at a specific time. A delay period for the command to be sent from a master of the computer system to a slave of the computer system via the serial bus is determined, where the delay period determined based on a length of an arbitration phase of the transaction. The command is then sent to the slave of the computer system via the serial bus after the delay period.

30 Claims, 9 Drawing Sheets

SYSTEM AND METHOD FOR DETERMINISTIC TRANSACTIONS ON A SERIAL BUS

RELATED APPLICATIONS

This application claims priority to and the benefit of U.S. Provisional Patent Application No. 62/621,481, entitled "SYSTEMS AND METHOD FOR DETERMINISTIC TRANSACTIONS ON A SERIAL BUS," filed Jan. 24, 2018, the contents of which are hereby incorporated herein by reference in its entirety as if fully set forth below and for all applicable purposes

DESCRIPTION OF THE RELATED ART

Computing devices comprising at least one processor coupled to a memory are ubiquitous. Computing devices may include personal computing devices (PCDs) such as desktop computers, laptop computers, portable digital assistants (PDAs), portable game consoles, tablet computers, cellular telephones, smart phones, and wearable computers. In order to meet the ever-increasing processing demands of users, PCDs increasingly incorporate multiple processors or cores sending instructions or commands to one or more integrated circuit components (ICs).

In such PCDs one or more processors or cores may communicate with multiple ICs via one or more common or multi-drop serial bus. An example of such a common serial bus is power management bus where one or more processors may communicate with multiple power management ICs (PMICs) of the PCD via a common system power management interface (SPMI) in accordance with the SPMI protocol specification. The processors or cores communicate with the PMICs in a master/slave relationship.

However, serial bus protocols like the SPMI bus protocol that rely on an arbitration process to determine which master will a communication to which slave for a particular transaction are non-deterministic in the timing. The variable length arbitration process prevents knowing when a specific command will be sent to and executed by a particular slave. This prevents such buses like SPMI being used for slaves with components that require deterministic timing for command execution, such as radio frequency front end (RFFE) components. As a result RFFE components are typically either placed on a separate IC, or RFFE components on a general purpose IC, such as a PMIC, require a separate deterministic bus in addition to the standard SPMI bus used to control the rest of the IC. Both approaches increase the cost and/or number of pins needed to implement RFFE components.

Accordingly, there is a need for improved systems and methods to enable deterministic transactions over a non-deterministic serial bus, such as SPMI, without the need for additional pins or a separate, deterministic bus or communication channel.

SUMMARY OF THE DISCLOSURE

Apparatuses, systems, methods, and computer programs are disclosed for deterministic transactions over a serial bus, such as an SPMI bus. An exemplary method comprises that a command to be sent over the serial interconnect in a transaction is to be executed at a specific time. A delay period for the command to be sent from a master of the computer system to a slave of the computer system via the serial bus is determined, where the delay period determined based on a length of an arbitration phase of the transaction. The command is then sent to the slave of the computer system via the serial bus after the delay period.

In another embodiment, an exemplary system comprises a serial bus of a computing device. The serial bus operating in a master/slave configuration with a plurality of slaves and a plurality of masters in communication with the serial bus. The system also includes logic configured to determine that a command to be sent over the serial bus in a transaction is to be executed at a specific time; determine a delay period for the command to be sent from one of the plurality of masters via the serial bus, the delay period determined based on a length of an arbitration phase of the transaction; and send the command from the one of the plurality of masters via the serial bus after the delay period.

Other systems, methods, and computer programs for operating a serial bus in a timer deterministic manner, and additional aspects of the same, will be appreciated in view of the detailed description below.

BRIEF DESCRIPTION OF THE DRAWINGS

In the Figures, like reference numerals refer to like parts throughout the various views unless otherwise indicated. For reference numerals with letter character designations such as "102a" or "102a", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" or "image" may also include files having executable content, such as: object code, scripts, byte code, markup language files, and patches.

In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component.

One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the term "computing device" is used to mean any device implementing a processor (whether analog or digital) in communication with a memory, such as a desktop computer, gaming console, or server. A "computing device" may also be a "portable computing device" (PCD), such as a laptop computer, handheld computer, or tablet computer. The terms PCD, "communication device," "wireless device," "wireless telephone", "wireless communication device," and "wireless handset" are used interchangeably herein. With the advent of third generation ("3G") wireless technology, fourth generation ("4G"), Long-Term Evolution (LTE), etc., greater bandwidth availability has enabled more portable computing devices with a greater variety of wireless capabilities. Therefore, a portable computing device may also include a cellular telephone, a pager, a smartphone, a navigation device, a personal digital assistant (PDA), a portable gaming console, a wearable computer, or any portable computing device with a wireless connection or link.

In order to meet the ever-increasing processing demands placed on PCDs, within the small form factors, PCDs increasingly incorporate multiple processors or cores (such as central processing units or "CPUs") running various threads in parallel. Such PCDs often include common or shared serial buses over which one or more of the processors or cores may communicate with various additional components of the PCD, including various integrated circuits (ICs).

These communications over the common or shared serial bus may be a master/slave relationship with one or more processors or cores (or software executed by the cores/processors) being the master to one or more slave ICs. As used herein, the term "master" refers to the component that sends a communication over the bus (whether the "sender" is a processor, core, integrated circuit, or software), while the term "slave" refers to the component that receives the communication over the bus (whether the "receiver" is a processor, core, integrated circuit, or software). An example of a common or shared bus is a system power management bus or interface (SPMI) shared by multiple power management ICs (PMICs). However, serial bus protocols like the SPMI bus protocol that rely on an arbitration process to determine which master will send a communication to which slave for a particular transaction are non-deterministic in the timing. The variable length arbitration process prevents knowing when a specific command will be sent to and executed by a particular slave. This prevents such buses like SPMI being used for slaves with components that require deterministic timing for command execution, such as radio frequency front end (RFFE) components.

Figure 1A:
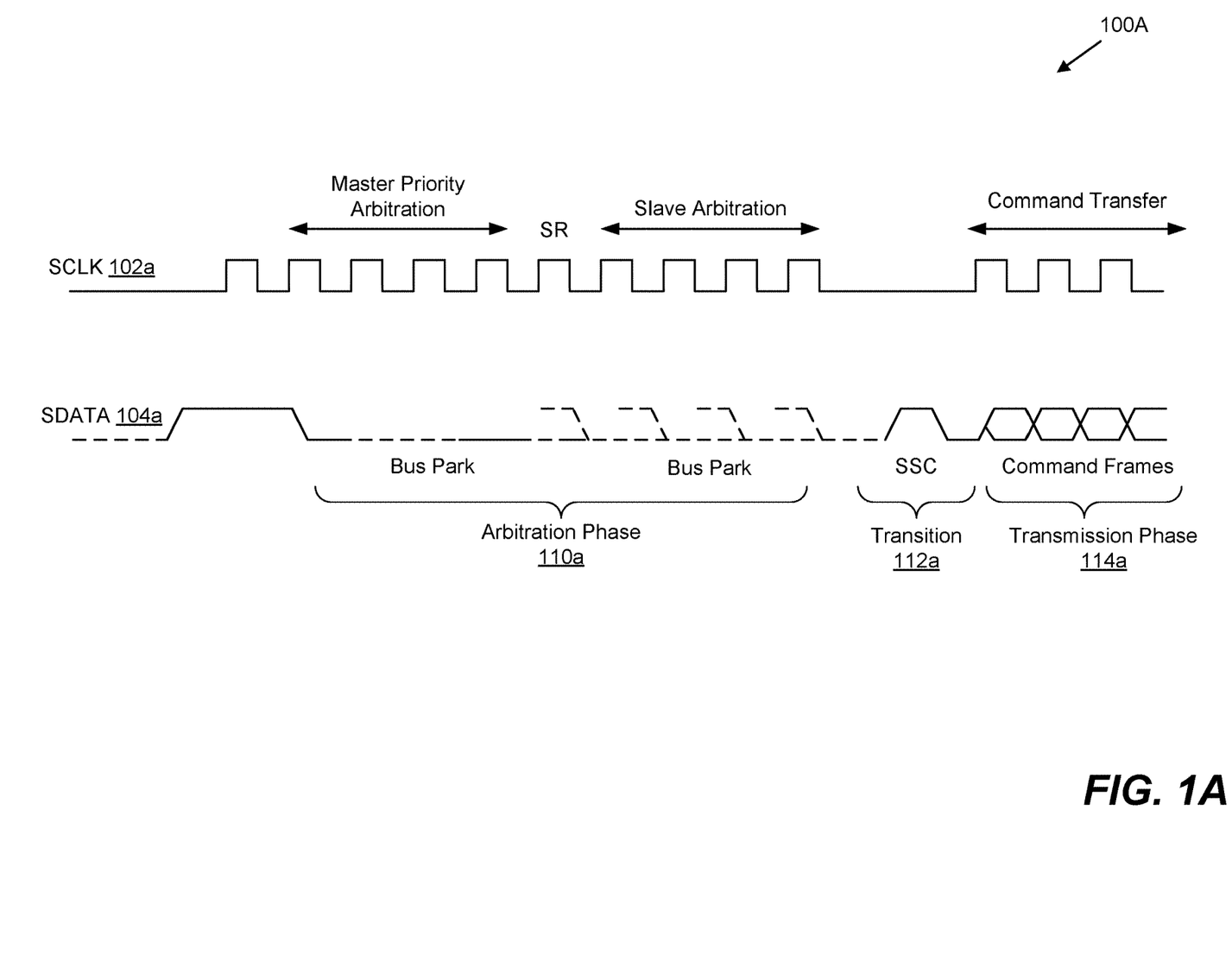
FIG. 1A is a timing diagram for an exemplary master arbitration and an exemplary slave arbitration for a serial bus.
Figure 1B:
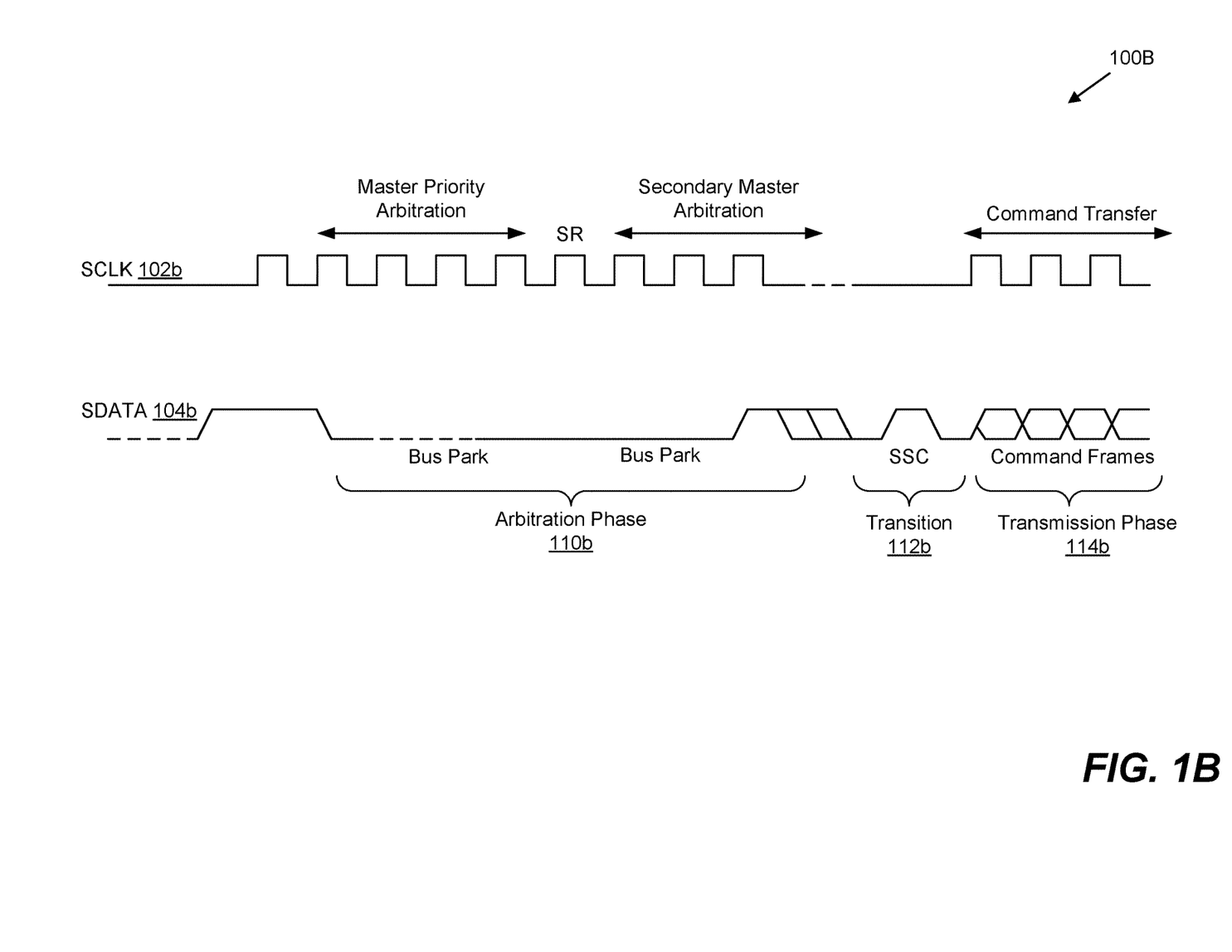
FIG. 1B is a timing diagram for an exemplary master arbitration and secondary master arbitration for a serial bus.

For example, FIG. 1A illustrates an exemplary timing diagram 100A of a transaction over a serial bus such as an SPMI bus. The serial clock SCLK 102a and the serial data SDATA 104a of the serial bus is illustrated in FIG. 1A. As illustrated in FIG. 1A there is an arbitration phase 110a which in the illustrated example includes arbitration for the master to send the communication or command, and the slave to receive the communication or command. After the arbitration phase 110a there is a transition 112a period where a sequence start condition (SSC) is sent to the slave to prepare it to receive the command. Finally, there is a transmission phase 114a where the command is transferred to the receiving slave. Similarly, FIG. 1B illustrates another exemplary timing diagram 100B of another transaction over the serial bus of FIG. 1A. In FIG. 1B, the arbitration phase 110b includes a first master arbitration as well as a second master arbitration. After the arbitration phase 110b there is a transition 112b period where the SSC is sent to the slave to prepare it to receive the command. Finally, there is a transmission phase 114b where the command is transferred to the receiving slave.

Because the arbitration phase 110a of FIG. 1A varies in length from the arbitration phase 110b of FIG. 1B, transactions over the serial bus are non-deterministic with respect to time. As a result RFFE components have been typically either placed on a separate IC, or RFFE components on a general purpose IC, such as a PMIC, have require a separate deterministic bus in addition to the standard SMPI bus used to control the rest of the IC. Both approaches increase the design or manufacturing cost and/or number of pins needed to implement RFFE components.

Figure 1C:
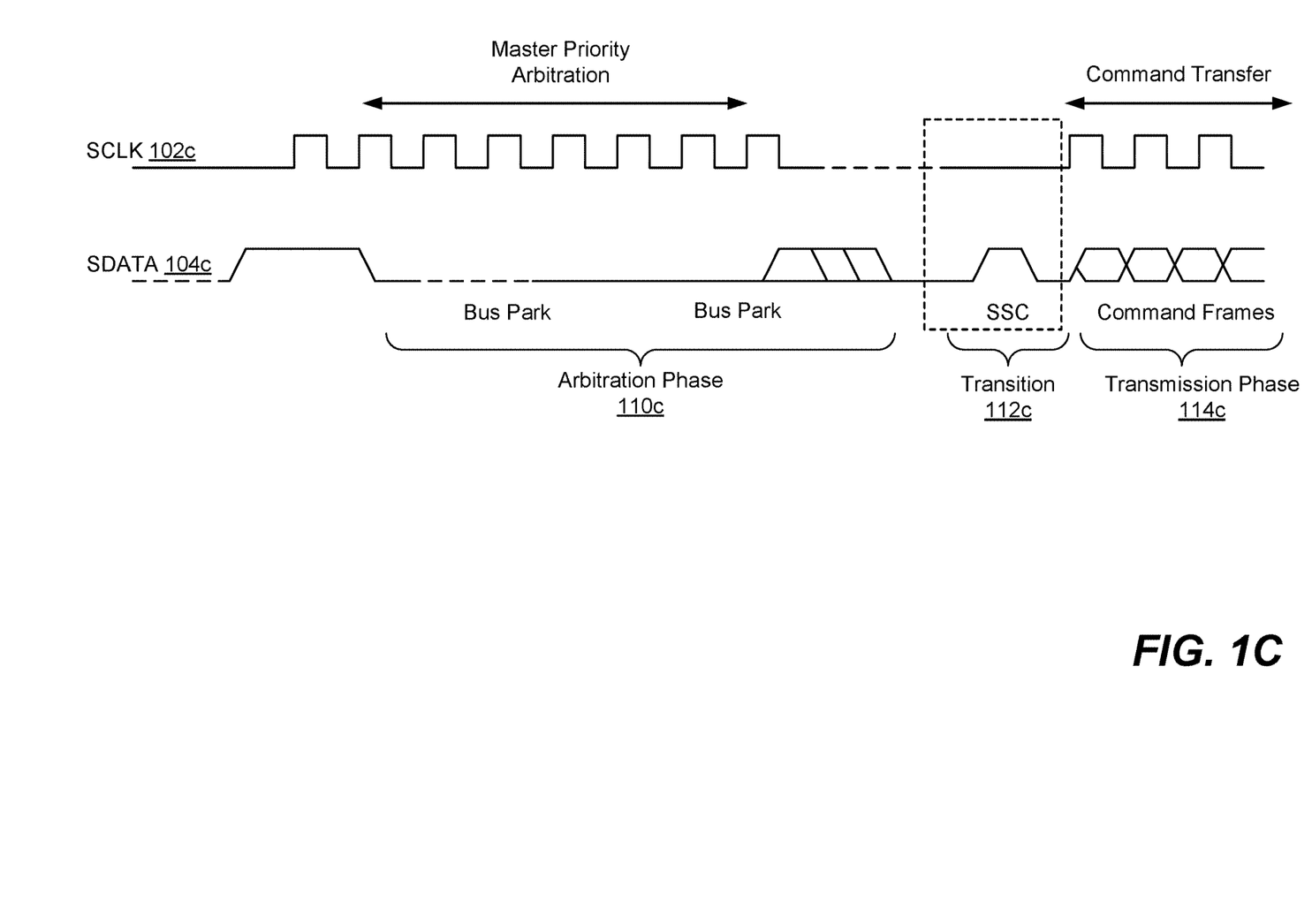
FIG. 1C is a timing diagram for an exemplary master arbitration that allows for deterministic transactions over a serial bus.

The present systems and methods allow for time-deterministic transactions over the serial bus, such as an SPMI bus, without the need for an additional bus and without the need to alter the bus protocol. As illustrated in FIG. 1C, the present systems and methods focus on the transition 112c period between the arbitration phase 110c and the transmission phase 114c to ensure that a command sent during the transmission phase 114c is received and executed by the slave at a desired or specific time, resulting in a time-deterministic transaction.

When a time-deterministic transaction is desired, a delay, such as through a timer, is inserted into the transition 112c (either before, during, or after the SSC is sent). The delay may vary in length and may be determined or based on the length of the arbitration phase 110c as well as the expected length of the transmission phase 114c (due to the length of time needed to send a particular command to the slave IC for example). In this manner, the variable length delay ensures that the command is received and executed by the slave IC at a desired or certain time, regardless of the variable length of the arbitration phase 110c. When a transaction is not required to be time-deterministic, the serial bus may operate normally, without the delay or timer. In this manner, a standard serial bus may be made to operate in a time-deterministic manner when desired, such as for communications with RFFE components on a PMIC, without the need for a separate time-deterministic bus (such as an RFFE bus), without the need for extra pins on the serial bus, and without the need for specialized ICs.

Although the discussion herein is in terms of power management buses such as SPMI and PMICs for brevity's sake, the concepts, systems and methods disclosed herein are equally applicable to the inter-integrated circuit (I2C) bus, or the I3C bus, or any other multi-drop serial bus. Additionally, although discussed herein in relation to PCDs, the systems and methods herein—and the considerable savings made possible by the systems and methods—are applicable to any computing device.

Figure 2A:
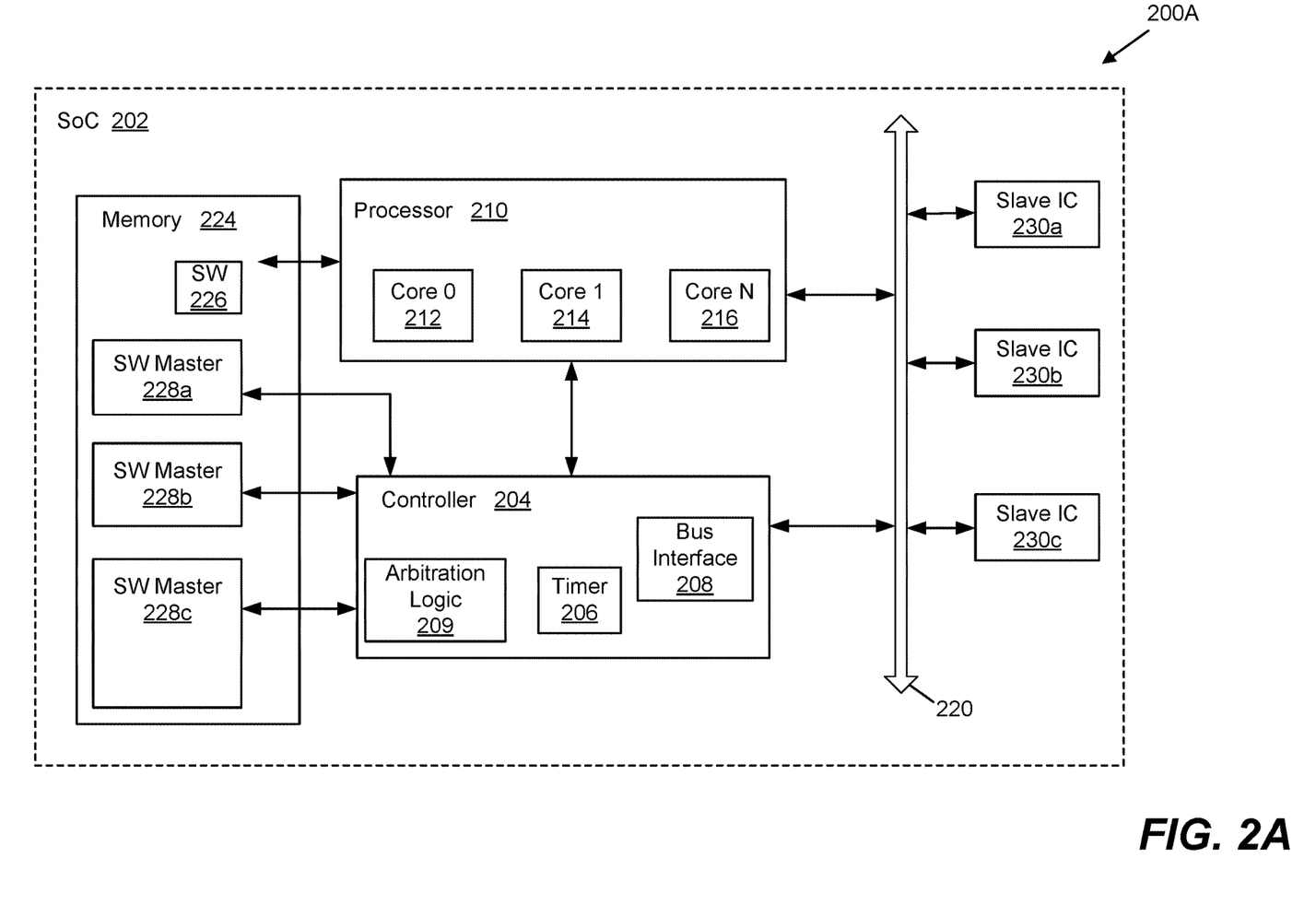
FIG. 2A is a block diagram of an embodiment of a system that allows deterministic transactions to one or more integrated circuits (ICs) sharing a common serial bus.
Figure 2B:
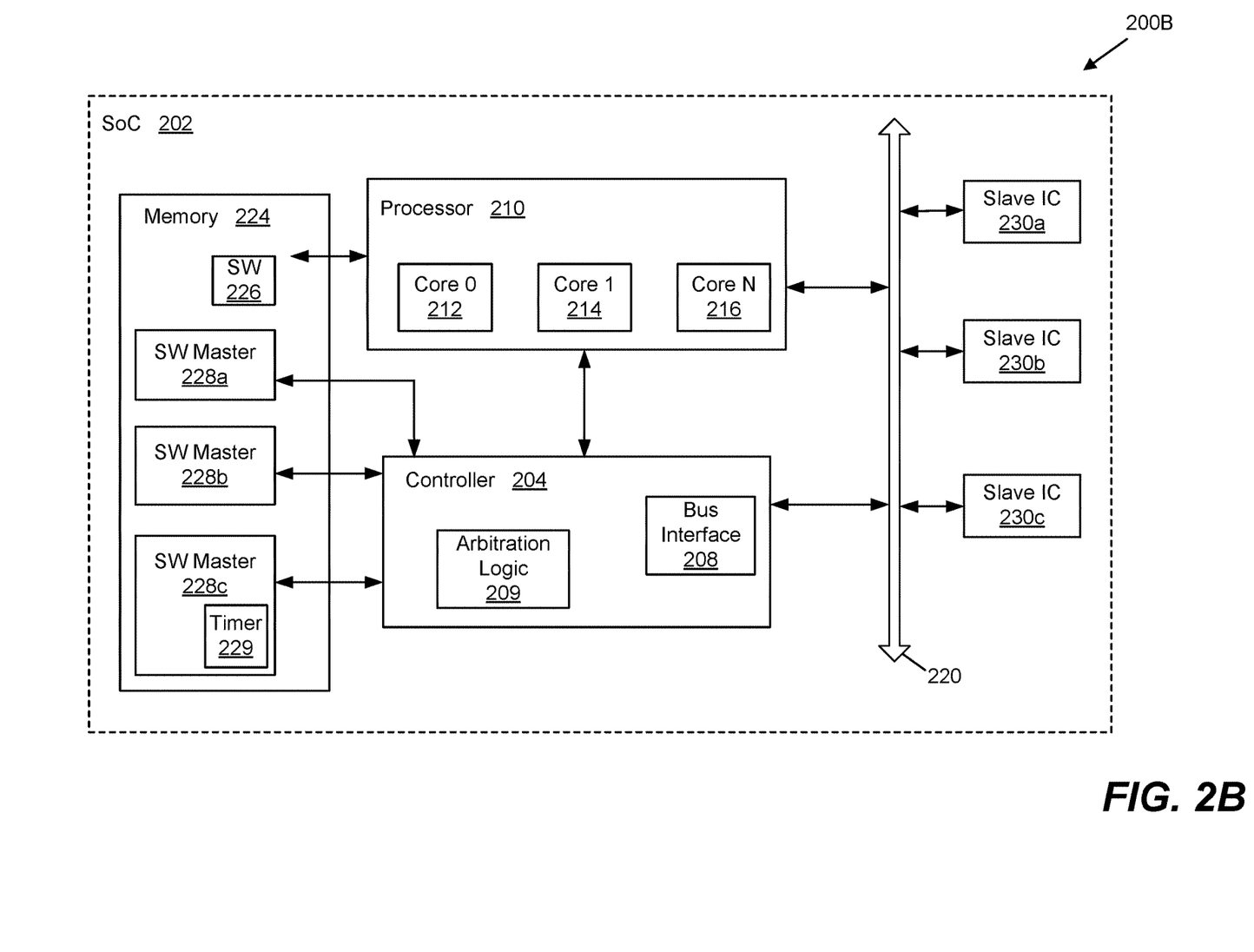
FIG. 2B is a block diagram of another embodiment of a system that allows deterministic transactions to one or more integrated circuits (ICs) sharing a common serial bus.

FIGS. 2A-2B are block diagrams of alternate embodiments of a system 200A and 200B that allows for time-deterministic transactions over a serial bus. The systems 200A and 200B may be implemented on, or as a portion of, a system-on-a-chip (SoC) 202 of a computing device. The systems 200A and 200B may be implemented in any computing device, including a personal computer, a workstation, a server, or a PCD. The systems 200A and 200B may also be implemented in a computing device that is a portion/component of another product such as an appliance, automobile, airplane, construction equipment, military equipment, etc.

Turning first to FIG. 2A, the illustrated system 200A includes a controller 204 electrically coupled to one or more processor 210 which may include multiple cores 212, 214, 216. The controller 204 and processor 210 are also electrically coupled to one or more slave ICs 230a-230c via a shared interconnect or bus 220. In an embodiment the shared interconnect or bus 220 comprises a serial communication interface bus or interconnect, such as a system power management interface (SPMI) bus. The illustrated slave ICs 230a-230c may identical or may be different/have different components as desired. In an embodiment, the slave ICs 230a-230c may be PMICs coupled to the SPMI and one IC, IC 230c may include one or more RFFE components, where the RFFE component(s) may execute commands received by the IC 230c over the serial bus.

The controller 204 may comprise various components including arbitration logic 209 configured to arbitrate or decide which among the various command or instructions from the software 226 and/or cores 212, 214, 216 to forward over the bus 220. The controller 104 also includes other components including a timer 206 and Bus Interface 208.

Processor 210 may be a central processing unit (CPU) comprised of multiple processing components or cores, such as core 0 212, core 1 214, and core N 216 illustrated in FIG. 2A. As will be understood, additional processing components may also be included in the SoC 202, either included in processor 210 or external to processor 120. Processor 210 and or cores 212-216 are also electrically coupled with memory 224 which may be a system memory. Memory 224 may contain or store software 226 comprising code, task, or instructions executed by one or more of processor 210/cores 212-216. Additionally, memory 224 may contain or store additional software, including software masters (SW Masters 228a-228c).

One or more of software 226, processor 210, SW masters 228a-228c, and/or cores 212-216 may act as a master and communicate with slave ICs 230a-230c over bus 220, either directly or through controller 204. Such communication with slave ICs 230a-230c may include instructions, tasks, signals, commands, etc. over the common bus 220. For a typical transaction with a slave IC 230a-230C the transaction timing illustrated in FIG. 1A or 1B may be followed. However, for time deterministic transactions the system 200A may utilize the transaction timing of FIG. 1C.

Figure 3:
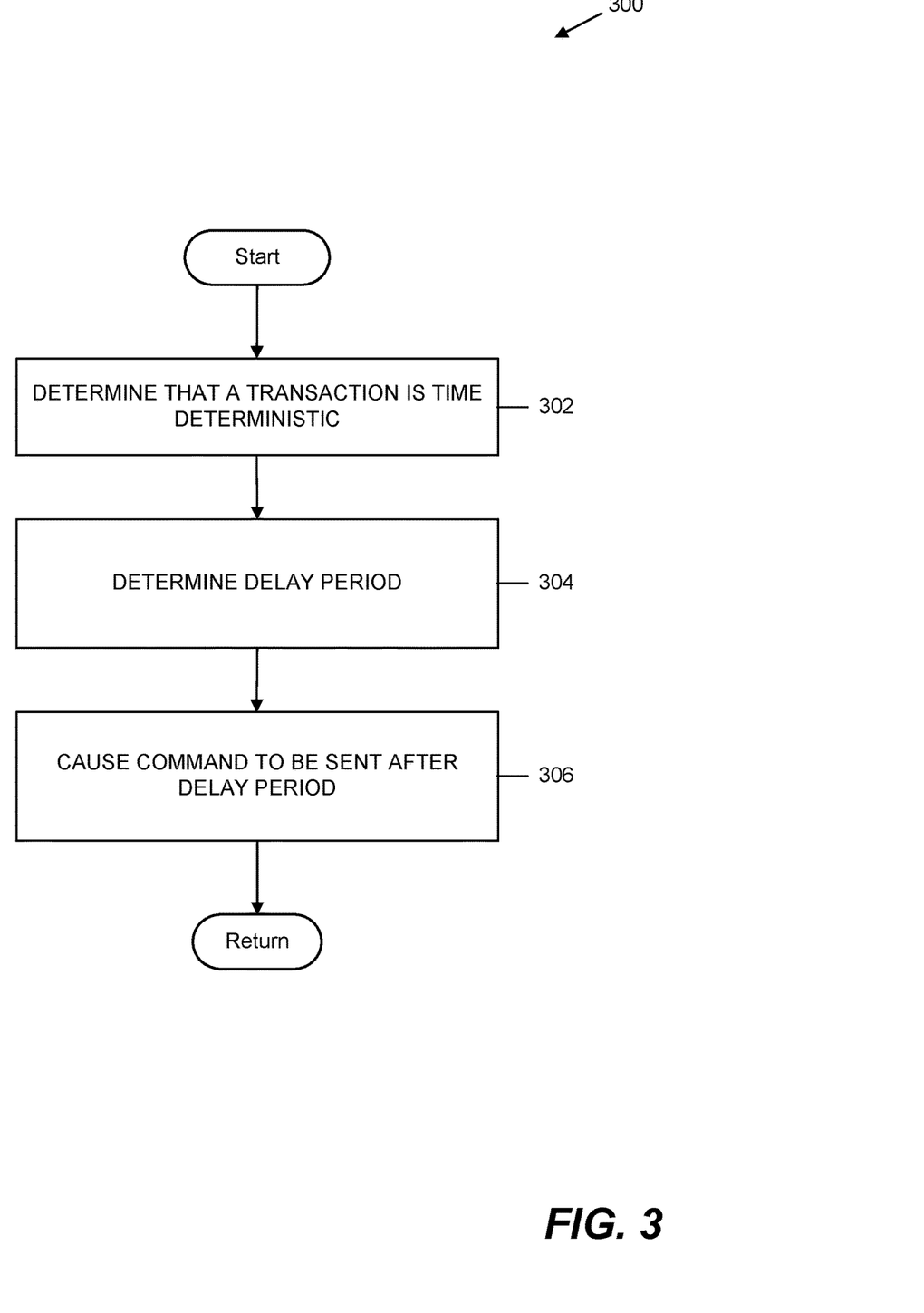
FIG. 3 is a flowchart illustrating an exemplary method for providing deterministic transactions to one or more integrated circuits (ICs) sharing a common serial bus.

An exemplary method or process for executing a time deterministic transaction with the system 200A (or 200B) is illustrated in FIG. 3. As illustrated in FIG. 3, a determination is made in block 302, that a particular transaction needs to be time deterministic. This determination may be made based on the component to which a command to be sent is directed, may be based on the nature of the command itself, may be based on the master sending the command, etc., or may be made using any combination of these factors. The determination in block 302 may be made in an embodiment by the software 226 of system 200A (FIG. 2A), by some other portion of system 200A, and/or by a combination of software 226 with another portion of system 200A.

The transaction then enters the arbitration phase 110c of the timing diagram (FIG. 1C). Returning to FIG. 3, following the arbitration phase 110c, a delay period is determined or calculated in block 304. The delay period is determined or calculated to ensure that that the command to be sent to a slave component (which in an example may be an RFEE component of slave IC 230C of FIG. 2A) is received and executed at a specific desired time. The determination or calculation of the delay period takes into account the length of the arbitration phase 110c that just occurred, as well as the length of time of the upcoming transmission phase 114c for the command being sent to IC 230C.

In an embodiment, software 226 of system 200A may calculate the delay period and send information about the delay period to another component such as the master that will send the command to IC 230C or controller 204. In other embodiments, software 226 may send instead send information that a delay period is necessary as well as the command to be sent to another component (such as the master that will send the command to IC 230C or controller 204) and this other component may calculate or determine the delay period needed. Finally, in block 306 of FIG. 3, the command is sent after the delay period. Continuing with the above example, system 200A can ensure that the command is not sent to IC 230C until after the delay period has expired. In an embodiment, this may be accomplished by a timer such as timer 206 in controller 204 of FIG. 2A.

Again, for a subsequent transaction where a command to be sent to a slave IC 230a-230c does not need to be executed at a particular time, method or process 300 of FIG. 3A is not followed and the serial bus 220 of system 200A will operate normally (i.e. without any inserted delay before sending the command). In this manner a non-time deterministic serial bus 220 such as an SPMI bus may be made to operate in a time deterministic manner when required, without the need for additional pins or a separate bus/interface.

One skilled in the art will understand that FIG. 2A shows one example embodiment of a system 200A that may operate serial bus 220 in a time deterministic manner. Other embodiments are possible, including embodiments where the timer is located in or at another component instead of, or in addition to, controller 204. For example, FIG. 2B illustrates another embodiment of a system 200B that may be used to operate serial bus 220 in a time deterministic manner and/or to implement method 300 of FIG. 3.

As illustrated in FIG. 2B, timer 229 is implemented in one or more masters that send commands to slave ICs 230a-230c. In all other respects, FIG. 2B is the same as FIG. 2A. In the illustrated embodiment, timer 229 is illustrated in one software master (SW Master 228c). In other embodiments, timer 229 may be implemented in a different master, or in more than one master. For embodiments where timer 229 is implemented in all masters (or in controller 204) it may not matter which master wins the arbitration phase 110c (see FIG. 1C) when a timer deterministic transaction is needed—each master may use its timer to ensure the required delay before sending the command to the receiving slave IC 230a-230c. However, in the embodiment of FIG. 2B, where only SW Master 228c includes timer 229, for time deterministic transactions it is required that SW Master 228c win the arbitration phase 110c (FIG. 1C) in order to ensure that the command is received and executed at the required time. Ensuring SW Master 228c wins the arbitration phase 110c may be accomplished by any desired method when a determination is made that a time deterministic transaction is needed. For example, SW Master 228c may raise the SDATA 104c line high to ensure that it wins arbitration phase 110c Turning to FIG. 4-5, exemplary flowcharts illustrating exemplary methods 400 and 500 that may be performed by a component such as a master to implement the method of FIG. 3 and ensure that a command is executed by a slave IC (or component thereof) at a desired or required time. In an embodiment, methods 400 and/or 500 may be performed by a master capable of delaying transmission of commands to a slave, such as SW Master 228c of system 200B (FIG. 2B).

Figure 4:
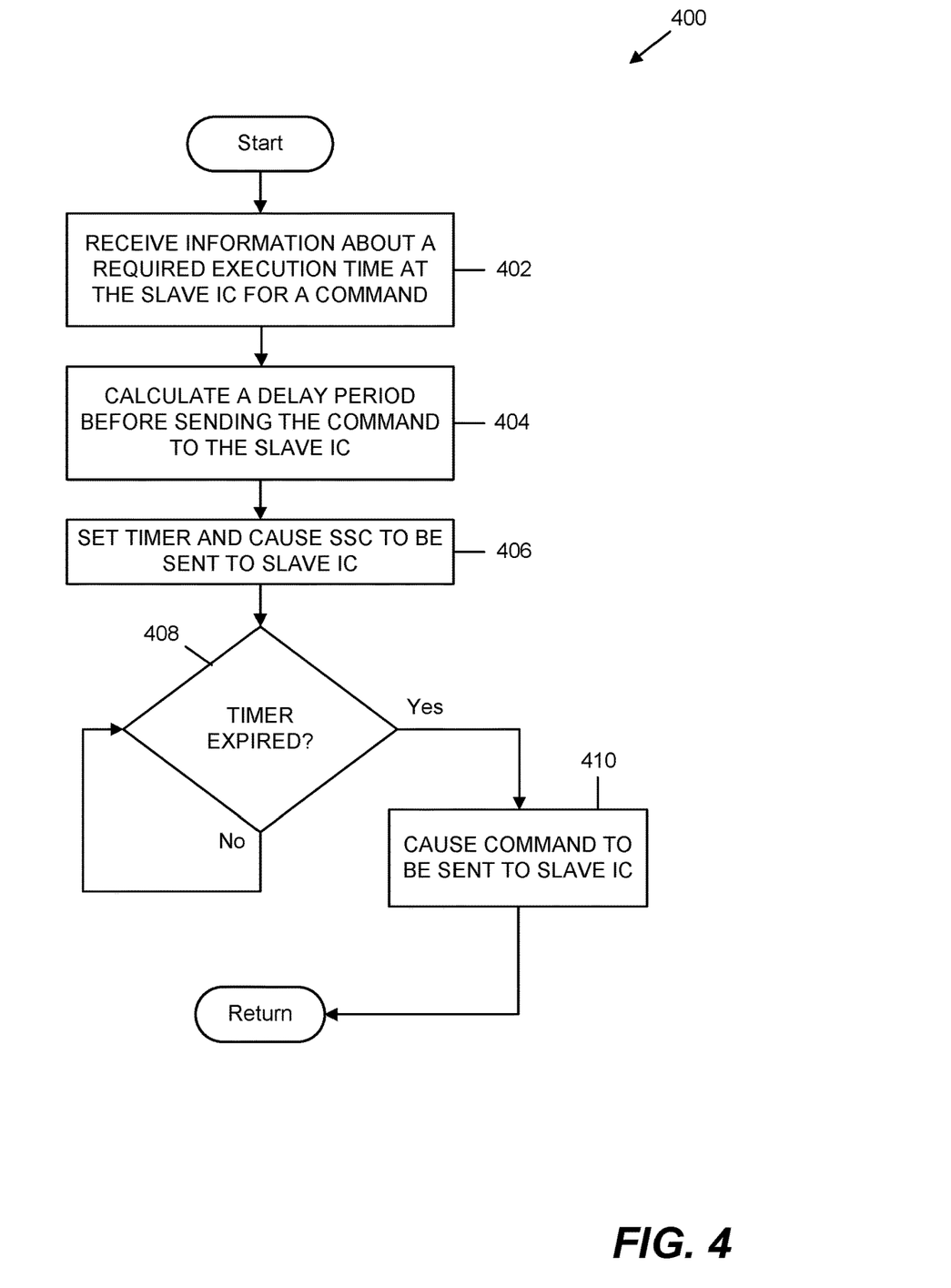
FIG. 4 is a flowchart illustrating exemplary steps that may be performed by a component such as a master to implement the method of FIG. 3.

Turning to method 400 of FIG. 4, in block 402 SW Master 228c receives information about a required execution time for a command to be sent to a slave, such as slave IC 230c of FIG. 2B. The information in block 402 may be received during the arbitration phase 110c (see FIG. 1C) or after SW Master 228c wins the arbitration phase 110c, i.e. during the transition phase 112c.

Continuing to block 404, based on the received information SW Master 228c (or another component of system 200B) calculates or determines a delay period to delay before sending the command to slave IC. The delay period is calculated or determined to ensure receipt and execution of the command at the desired time. Calculation or determination of the delay period in block 404 may take into account the length of the arbitration phase 110c of the transaction, as well as the length of time needed to transmit the command to the slave IC during the transition phase 114c.

Once the delay period is known, a timer is set and the sequence start condition (SSC) is sent to the slave IC in block 406 (such as slave IC 230c of FIG. 2B). The timer may be located at or part of SW Master 228c (timer 229 FIG. 2B), or may be located at/part of another component (such as timer 209 of controller 204 in FIG. 2A). Although shown as one block 406, setting the timer and sending the SSC to the slave IC may instead comprise separate steps, and those steps may be performed in any desired order. Additionally, although shown as occurring after the timer is set, sending the SSC to the slave IC may occur at any desired time including before the timer is set, while the timer is pending, or after the timer expires.

Continuing to block 408 the timer is monitored, and the command is not sent to the slave IC while the timer is pending. Once the timer expires in block 408, method 400 continues to block 410 where the command is sent to the slave IC at the time calculated or determined to ensure that slave IC executes the command at the required time. Note that when a command is not required to be executed at a desired or required time, the steps of method 400 need not be performed.

Figure 5:
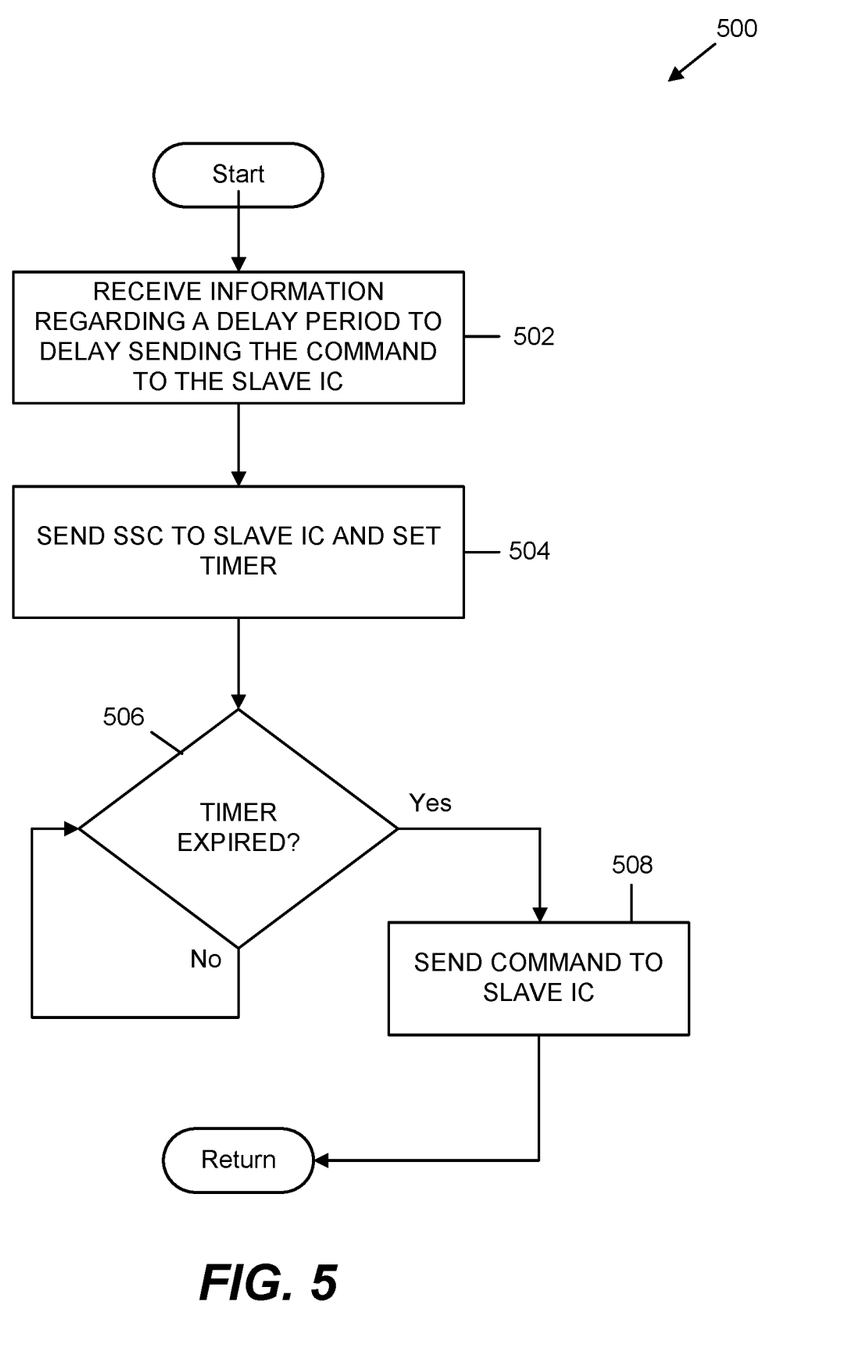
FIG. 5 is a flowchart illustrating alternative exemplary steps that may be performed by a component such as a master to implement the method of FIG. 3.

Turning to FIG. 5, an alternative method 500 is illustrated. Method 500 is similar to method 400 of FIG. 4, except that in method 500 the delay period is pre-determined or calculated and sent to the master rather than being calculated or determined at the master in method 400. In method 500 the delay period may be determined, such as by software 226 following the arbitration phase 110c (FIG. 1C). The delay period is pre-determined as a period of time to delay sending the command of the transaction to the receiving slave IC to ensure that the command is executed at a specific time (such as by an RFFE component of slave IC 230c).

In block 502 information about the pre-determined delay period is received, such as by SW Master 228c (FIG. 2B) or controller 204 (FIG. 2A). The received information may be a period of time to set a timer, such as timer 229 of SW Master 228c or timer 209 of controller 204. In block 504 the timer is set to the delay period and the SSC is sent to the slave IC.

Although shown as one block 504, setting the timer and sending the SSC to the slave IC may instead comprise separate steps, and those steps may be performed in any desired order. Additionally, although shown as occurring before the timer is set, sending the SSC to the slave IC may occur at any desired time including before the timer is set, while the timer is pending, or after the timer expires.

Continuing to block 506 the timer is monitored, and the command is not sent to the slave IC while the timer is pending. Once the timer expires in block 506, method 500 continues to block 508 where the command is sent to the slave IC at the time calculated or determined to ensure that slave IC executes the command at the required time. Note that when a command is not required to be executed at a desired or required time, the steps of method 500 need not be performed.

Figure 6:
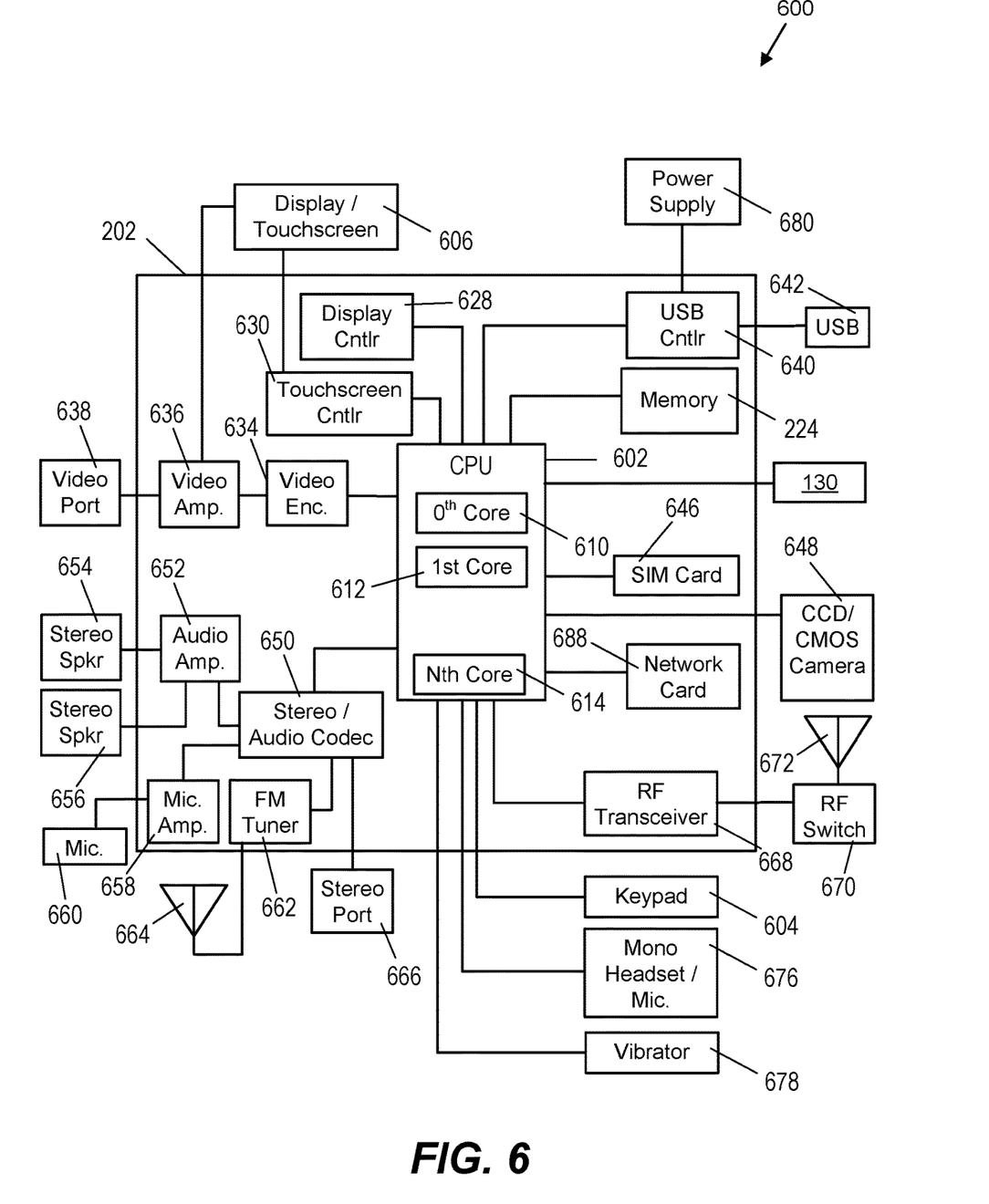
FIG. 6 is a block diagram of an exemplary computing device in which the system of FIGS. 2A-2B and/or methods of FIGS. 3-5 may be implemented.

System 200A (FIG. 2A) or 200B (FIG. 2B), as well as methods 400 (FIG. 4) and/or 500 (FIG. 5) may be incorporated into or performed by any desired computing system, including a PCD. FIG. 6 illustrates an exemplary PCD 600 into which system 200A/200B may be incorporated, or that may perform methods 400 and/or 500. In the embodiment of FIG. 6, the PCD 600 includes a system-on-a-chip (SoC 202) that may comprise a multicore CPU 602. The multicore CPU 602 may include a zeroth core 610, a first core 612, and an Nth core 614, which may be cores 212-216 of FIG. 2A/2B. One of the cores may comprise, for example, a graphics processing unit (GPU) with one or more of the others comprising the CPU.

A display controller 628 and a touch screen controller 630 may be coupled to the CPU 602. In turn, the touch screen display 606 external to the on-chip system 202 may be coupled to the display controller 628 and the touch screen controller 630. FIG. 6 further shows that a video encoder 634, e.g., a phase alternating line (PAL) encoder, a sequential color a memoire (SECAM) encoder, or a national television system(s) committee (NTSC) encoder, is coupled to the multicore CPU 602. Further, a video amplifier 636 is coupled to the video encoder 634 and the touch screen display 606.

Also, a video port 638 is coupled to the video amplifier 636. As shown in FIG. 6, a universal serial bus (USB) controller 640 is coupled to the multicore CPU 602. Also, a USB port 642 is coupled to the USB controller 640. Memory 224 and a subscriber identity module (SIM) card 646 may also be coupled to the multicore CPU 602.

Further, as shown in FIG. 6, a digital camera 648 may be coupled to the multicore CPU 602. In an exemplary aspect, the digital camera 648 is a charge-coupled device (CCD) camera or a complementary metal-oxide semiconductor (CMOS) camera.

As further illustrated in FIG. 6, a stereo audio coder-decoder (CODEC) 650 may be coupled to the multicore CPU 602. Moreover, an audio amplifier 652 may be coupled to the stereo audio CODEC 650. In an exemplary aspect, a first stereo speaker 654 and a second stereo speaker 656 are coupled to the audio amplifier 652. FIG. 6 shows that a microphone amplifier 658 may be also coupled to the stereo audio CODEC 650. Additionally, a microphone 660 may be coupled to the microphone amplifier 658. In a particular aspect, a frequency modulation (FM) radio tuner 662 may be coupled to the stereo audio CODEC 650. Also, an FM antenna 664 is coupled to the FM radio tuner 662. Further, stereo headphones 666 may be coupled to the stereo audio CODEC 650.

FIG. 6 further illustrates that a radio frequency (RF) transceiver 668 may be coupled to the multicore CPU 602. An RF switch 670 may be coupled to the RF transceiver 668 and an RF antenna 672. A keypad 604 may be coupled to the multicore CPU 602. Also, a mono headset with a microphone 676 may be coupled to the multicore CPU 602. Further, a vibrator device 678 may be coupled to the multicore CPU 602.

FIG. 6 also shows that a power supply 680 may be coupled to the on-chip system 202. In a particular aspect, the power supply 680 is a direct current (DC) power supply that provides power to the various components of the PCD 600 that require power. Further, in a particular aspect, the power supply is a rechargeable DC battery or a DC power supply that is derived from an alternating current (AC) to DC transformer that is connected to an AC power source.

FIG. 6 further indicates that the PCD 600 may also include a network card 688 that may be used to access a data network, e.g., a local area network, a personal area network, or any other network. The network card 688 may be a Bluetooth network card, a WiFi network card, a personal area network (PAN) card, a personal area network ultra-low-power technology (PeANUT) network card, a television/cable/satellite tuner, or any other network card well known in the art. Further, the network card 688 may be incorporated into a chip, i.e., the network card 688 may be a full solution in a chip, and may not be a separate network card 688.

Referring to FIG. 6, it should be appreciated that a memory 130, touch screen display 606, the video port 638, the USB port 642, the camera 648, the first stereo speaker 654, the second stereo speaker 656, the microphone 660, the FM antenna 664, the stereo headphones 666, the RF switch 670, the RF antenna 672, the keypad 674, the mono headset 676, the vibrator 678, and the power supply 680 may be external to the on-chip system 202 or "off chip."

It should be appreciated that one or more of the method steps described herein may be stored in the memory as computer program instructions. These instructions may be executed by any suitable processor in combination or in concert with the corresponding module to perform the methods described herein. Certain steps in the processes or process flows described in this specification naturally precede others for the invention to function as described. However, the invention is not limited to the order of the steps or blocks described if such order or sequence does not alter the functionality of the invention. That is, it is recognized that some steps or blocks may performed before, after, or parallel (substantially simultaneously with) other steps or blocks. In some instances, certain steps or blocks may be omitted or not performed without departing from the invention. Further, words such as "thereafter", "then", "next", etc. are not intended to limit the order of the steps. Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for operating a serial bus of a portable computing device in a time deterministic manner, the method comprising:

determining that a command for a first slave to be sent over the serial bus in a transaction is to be executed at a specific time, wherein the serial bus is operated according to a system power management interface (SPMI) protocol which issues commands independent of time, and the first slave requires commands issued in a time deterministic manner outside of the SPMI protocol;

determining a delay period for the command to be sent from a master of the portable computing device to the first slave of a plurality of slaves of the portable computing device via the serial bus, the delay period determined based on a length of an arbitration phase of the transaction and allowing the command to arrive at the specific time, the plurality of slaves including the first slave and one or more other second slaves which follow the SPMI protocol in which commands are received by the one or more other second slaves independent of time; and sending the command to the first slave of the portable computing device via the serial bus after the delay period so that the command arrives at the first slave at the specific time, wherein the portable computing device running the SPMI protocol is battery powered.

2. The method of claim 1, wherein determining the delay period for the command further comprises:

the master of the computer system receiving information about a required execution time for the command, and the master calculating the delay period from the received information.

3. The method of claim 1, wherein the delay period is further based on a length of a transmission phase of the transaction when the command is sent to the first slave.

4. The method of claim 1, further comprising:

setting a timer during a transition phase of the transaction following the arbitration phase of the transaction, and sending the command to the first slave after an expiration of the timer.

5. The method of claim 4, wherein the timer is located at the master of the computer system.

6. The method of claim 1, wherein:

the first slave comprises a power management integrated circuit (PMIC).

7. The method of claim 1, wherein the command is executed by the first slave which comprises a radio frequency front end component of the PMIC.

8. The method of claim 1, wherein the determination that the command to be sent over the serial bus is to be executed at the specific time is based on the command to be sent, a component of the first slave that will execute the command, or a combination thereof.

9. A system for operating a serial bus of a portable computing device in a time deterministic manner, the system comprising:

a serial bus of the portable computing device operating in a master/slave configuration, wherein the serial bus is operated according to a system power management interface (SPMI) protocol which issues commands independent of time, and a first slave requires commands issued in a time deterministic manner outside of the SPMI protocol;

a plurality of slaves including the first slave and one or more second slaves, and a plurality of masters in communication with the serial bus, the second slaves following the SPMI protocol in which commands are received by the one or more other second slaves independent of time; and logic of the portable computing device configured to:

determine that a command for the first slave to be sent over the serial bus in a transaction is to be executed at a specific time;

determine a delay period for the command to be sent from one of the plurality of masters via the serial bus to the first slave, the delay period determined based on a length of an arbitration phase of the transaction and allowing the command to arrive at the specific time; and sending the command from the one of the plurality of masters to the first slave via the serial bus after the delay period so that the command arrives at the first slave at the specific time, wherein the portable computing device having the SPMI protocol is battery operated.

10. The system of claim 9, wherein the wherein the logic configured to determine the delay period for the command further comprises logic at the one of the plurality of masters configured to:

receive information about a required execution time for the command, and calculate the delay period from the received information.

11. The system of claim 9, wherein the delay period is further based on a length of a transmission phase of the transaction when the command is sent to the first slave.

12. The system of claim 9, further comprising a timer and logic at the one of the plurality of masters configured to:

set the timer during a transition phase of the transaction following the arbitration phase of the transaction, and send the command after an expiration of the timer.

13. The system of claim 9, wherein the command is sent to the first slave which comprises a power management integrated circuit (PMIC).

14. The system of claim 9, wherein the command is executed by the first slave which comprises a radio frequency front end component of the PMIC.

15. The system of claim 9, wherein the determination that the command to be sent over the serial bus is to be executed at a specific time is based on the command to be sent, a component of of the first slave that will execute the command, or a combination thereof.

16. A computer program product comprising a non-transitory computer usable medium having a computer readable program code embodied therein, said computer readable program code adapted to be executed to implement a method for operating a serial bus of a portable computing device in a time deterministic manner, the method comprising:

determining that a command for a first slave to be sent over the serial bus in a transaction is to be executed at a specific time, wherein the serial bus is operated according to a system power management interface (SPMI) protocol which issues commands independent of time, and the first slave requires commands issued in a time deterministic manner outside of the SPMI protocol;

determining a delay period for the command to be sent from a master of the portable computing device to the first slave of a plurality of slaves of the portable computing device via the serial bus, the delay period determined based on a length of an arbitration phase of the transaction and allowing the command to arrive at the specific time, the plurality of slaves including the first slave and one or more other second slaves which follow the SPMI protocol in which commands are received by the one or more other second slaves independent of time; and sending the command to the first slave of the portable computing device via the serial bus after the delay period so that the command arrives at the first slave at the specific time, wherein the portable computing device running the SPMI protocol is battery powered.

17. The computer program product of claim 16, wherein determining the delay period for the command further comprises:

the master of the portable computing device receiving information about a required execution time for the command, and the master calculating the delay period from the received information.

18. The computer program product of claim 16, wherein the delay period is further based on a length of a transmission phase of the transaction when the command is sent to the first slave.

19. The computer program product of claim 16, wherein the method further comprises:
   setting a timer during a transition phase of the transaction following the arbitration phase of the transaction, and
   sending the command to the first slave after an expiration of the timer.

20. The computer program product of claim 19, wherein the timer is located at the master of the portable computing device.

21. The computer program product of claim 16, wherein:
   the first slave comprises a power management integrated circuit (PMIC).

22. The computer program product of claim 16, wherein the command is executed by the first slave comprising a radio frequency front end component of the PMIC.

23. The computer program product of claim 16, wherein the determination that the command to be sent over the serial bus is to be executed at a specific time is based on the command to be sent, a component of the first slave that will execute the command, or a combination thereof.

24. A computer system for operating a serial bus of a portable computing device in a time deterministic manner, the system comprising:
   means for determining that a command for a first slave to be sent over the serial bus in a transaction is to be executed at a specific time, wherein the serial bus is operated according to a system power management interface (SPMI) protocol which issues commands independent of time, and the first slave requires commands issued in a time deterministic manner outside of the SPMI protocol;
   means for determining a delay period for the command to be sent from a master of the portable computing device to the first slave of a plurality of slaves of the portable computing device via the serial bus, the delay period determined based on a length of an arbitration phase of the transaction and allowing the command to arrive at the specific time, the plurality of slaves including the first slave and one or more other second slaves which follow the SPMI protocol in which commands are received by the one or more other second slaves independent of time; and
   means for sending the command to the first slave of the portable computing device via the serial bus after the delay period so that the command arrives at the first slave at the specific time, wherein the portable computing device running the SPMI protocol is battery powered.

25. The system of claim 24, wherein the means for determining the delay period for the command further comprises:
   the master of the computing device receiving information about a required execution time for the command, and
   the master calculating the delay period from the received information.

26. The system of claim 24, further comprising:
   means for setting a timer during a transition phase of the transaction following the arbitration phase of the transaction, and
   means for sending the command to the first slave after an expiration of the timer.

27. The system of claim 26, wherein the timer is located at the master of the computing device.

28. The system of claim 24, wherein:
   the first slave comprises a power management integrated circuit (PMIC).

29. The system of claim 24, wherein the command is executed by the first slave comprising a radio frequency front end component of the PMIC.

30. The system of claim 24, wherein the determination that the command to be sent over the serial bus is to be executed at a specific time is based on the command to be sent, a component of the first slave that will execute the command, or a combination thereof.

* * * * *